E. JONES.
Harvester.
No. 1,745.
Reissued Aug. 23, 1864.
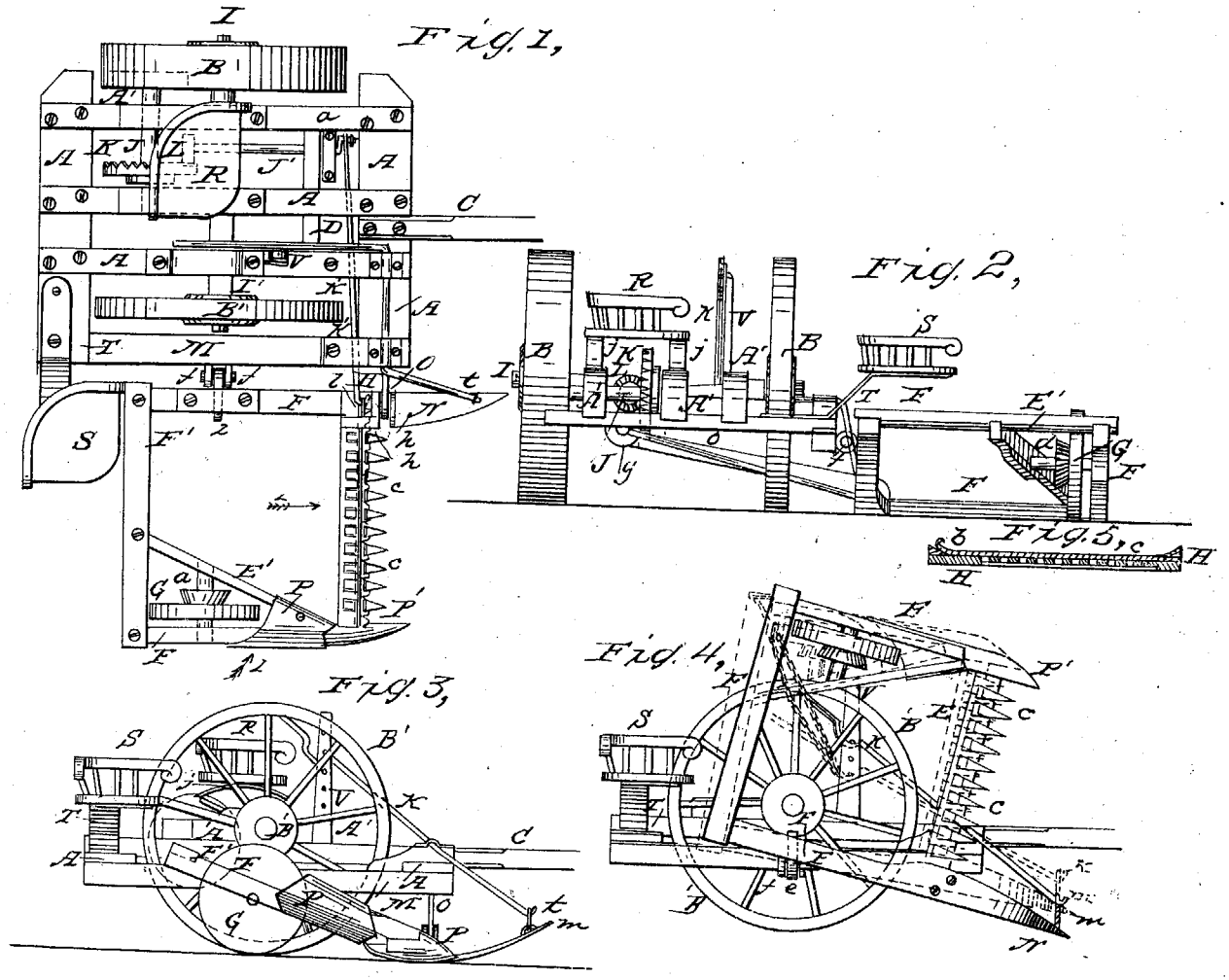
WITNESSES
John P. Jacobs
D. Dana Dodge
INVENTOR
Edwin Jones
By his attorney
Thos H. Dodge
N. PETERS. Photo-Lithographer, Washington, D. C.

UNITED STATES PATENT OFFICE.

EDWIN JONES, OF CHESTER CROSS ROADS, OHIO.

IMPROVEMENT IN HARVESTERS.

Specification forming part of Letters Patent No. 27,636, dated March 27, 1860; Reissue No. 1,745, dated August 23, 1864.

DIVISION No. 3.

*To all whom it may concern:*

Be it known that I, EDWIN JONES, of Chester Cross Roads, in the county of Geauga and State of Ohio, have invented certain new and useful Improvements in Combined Reapers and Mowers, of which the following is a full, clear, and exact description, reference being had to the accompanying drawings, forming a part of this specification, and in which—

Figure 1 represents a plan or top view of the machine with the grain-platform removed for mowing. Fig. 2 represents a rear view of the same. Fig. 3 represents a side view, looking in the direction of arrow 1, Fig. 1. Fig. 4 represents a similar view with the finger-beam raised or folded up for transportation or storage, the finger-beam being shown in two different positions—one in black, the other in red lines—to illustrate the mode of folding the finger-beam for transportation by aid of a lifting-lever and chain or cord. Fig. 5 represents a section of the finger and cutter bar on line *x x*, Fig. 1, looking in the direction of arrow 2, Fig. 1, only so much of the parts being shown as is necessary to illustrate the cutter-bar, in combination with the machine at the heel of the finger bar or beam.

The advantages of folding finger-beams in mowing-machines are now too well understood and appreciated to require any argument in their favor, and the invention which forms the subject-matter of this patent is designed in the main to supply a farmer with a reaping-machine whose grain-platform, together with its frame, can be folded up at the side of the machine, and also so raised up by means of a lever and cord or chain as to enable the reaping-machine to be transported or drawn from one field to another, or through narrow gates, with as much ease and facility as an ordinary two-wheeled cart or wagon.

In the accompanying drawings, A A A′ A′ A′ represent the main frame of a combined reaper and mower, supported by wheels B B′, the latter of which has an inner projecting rim, the under face of which is provided with cogs or teeth to take into similar cogs in a wheel on the end of shaft J, whereby when the machine is drawn forward by tongue C, which is rigidly attached to the front of the frame, a reciprocating motion is communicated from wheel B to cutter-bar H by means of pitman D, crank *a*, shafts J J′, bevel-gears K L, and the two cog-wheels first named.

F is the grain-platform frame, to the front end of which is connected the finger-beam E, to which the fingers *c*, through which the cutters work, are fastened in any well-known manner. The inner or heel end of the finger-beam is provided with a shoe, N, and the outer end with a shoe, P′. Frame F and finger-beam E are supported and sustained at the side of the main frame as follows:

Two lugs, *h h*, project up from the top of shoe N, and between which the right end of a coupling-arm, O, is hinged, the left end of said coupling-arm being hinged to a hanger or bracket fastened to the under side of the front outer corner of the main frame.

The inner side of frame F is pierced and sustained by a swivel, *e*, hinged between ears or lugs projecting from the side of piece M, fastened to the inner side of the main frame, while in a line, or nearly so, with the said swivel *e* a wheel, G, is arranged on journal *d* to support the outer side of frame F.

P is a sheath, which covers the space in front of wheel G, and thus prevents cut stalks from falling down therein to obstruct said wheel and the passage of the machine. Said sheath also strengthens the union of brace E′ with the frame F.

In reaping, the frame F is covered by a suitable platform to receive the grain. If the grain to be cut is short, then the platform need not extend clear back, in which case the raker from his seat S removes the gavels and deposits the same on the ground in front of the rear cross-piece of frame F; but if the grain is long, then a longer platform is used and the gavels removed from the rear of the frame F.

The raker's seat S is sustained from the rear corner of the frame by an arm, T, and the seat is made to front toward the standing grain at an angle of about forty-five degrees to the line of motion of the machine, thus enabling the raker to sweep the gavel back in rear of his seat without much, if any, turning of his body. The seat is also so arranged that the raker can rest his feet on the rear of frame F, whereby he can, by simply bearing his weight partially upon his feet, cause the rear of said frame to turn or rock back, thus raising the front of the frame, together with the finger-beam and cutters. This is quite convenient, since it enables the raker to raise the cutters at pleasure either to pass obstructions or from field to field, and that, too, while his hands are free to be employed in raking gavels from the platform. The cutters can also be raised by the driver from his seat R by means of a right-angled lever, *k*, supported in bearings *k′ k′*, the front end, *t*, of which is connected to the front of shoe N by a flexible connection, *m*, so that as the driver depresses the rear elevated end of said lever the point or end *t* will be raised, together with the finger-beam and cutters, the frame F in this instance turning on swivel *e* and wheel G as its axis of motion.

It will thus be seen that the finger-beam can rise and fall to conform to the surface of the ground independent of the up and down motions of the main frame, or it can be raised by the joint or separate action of the driver and raker.

When it is desirable to fold up the grain-platform and its frame for storage, transportation, or removal from one field to another, the outer end is turned up against the side of the machine, as shown in black lines, Fig. 4, when by depressing the rear of lever *k* shoe N, finger-beam, and frame are raised into the position shown in red lines, same figure, where they can be held by passing a pin or catch through a hole in standard U to keep lever *k* down. A rope or chain, *o*, may also be used to insure the folded position of the frame F.

A detachable reel may be supported on frame F, if desired, in which case it would be driven by a cord or band passing around a pulley on journal *d* of wheel G.

Other patented divisions of even date herewith describe some parts of the machine more fully, and to which reference can be had.

In folding up the finger-beam to the side of the main frame the operation may be effected with equal facility by raising first the front end of the finger-beam by means of the lever *k* and by then folding it up to the side of the main frame, in which case it will arrive directly to the position represented in red lines in Fig. 4, the attachment of the finger-beam and frame F to the main frame being such that they can readily be folded up, whether the front of the finger-beam be raised or not.

Having described one mode of applying my said improvements to practical use, what I claim as my invention under this patent is—

1. The arrangement of the folding frame to support the grain-platform, in combination with the main frame and raker's seat, substantially in the manner and for the purpose specified.

2. The combination, with a folding grain-platform to a rear-delivery reaping-machine, as set forth in the above first clause of claim, of a lever arranged and operating substantially as and for the purposes stated.

3. Hinging the frame F to a support on the inner side of the main frame and at a point within the periphery of wheel B′, in combination with hinging or supporting the front by a coupling-arm, O.

4. The raker's seat S in the described combination with frame F and the main frame, whether said seat is made to front at an angle to the line of motion of the machine or not.

5. Seat S with frame F, which supports the grain-platform, when arranged in relation to each other, in the manner and for the purposes herein shown and described.

In witness whereof I have hereunto subscribed my name.

EDWIN JONES.

In presence of—
JAMES P. STEPHENSON,
JOEL D. JONES.